United States Patent [19]
Nakazawa et al.

[11] Patent Number: 5,107,885
[45] Date of Patent: Apr. 28, 1992

[54] CHECK VALVE

[75] Inventors: Masahiko Nakazawa, Tokyo; Hisayoshi Matsumoto, Saitama, both of Japan

[73] Assignee: Masako Kiyohara, Kumamoto, Japan

[21] Appl. No.: 650,630

[22] Filed: Feb. 5, 1991

[30] Foreign Application Priority Data

Aug. 9, 1990 [JP] Japan .................. 2-84772[U]

[51] Int. Cl.⁵ .............................................. F16K 15/02
[52] U.S. Cl. ..................................... 137/496; 137/508
[58] Field of Search .............................. 137/496, 508

[56] References Cited

U.S. PATENT DOCUMENTS

| | | | |
|---|---|---|---|
| 2,547,377 | 4/1951 | De Juhasz | 137/496 |
| 3,297,260 | 1/1967 | Barlow | 137/496 X |
| 3,542,061 | 11/1970 | Kormos | 137/496 |
| 4,440,189 | 4/1984 | Graham | 137/508 X |
| 4,922,955 | 5/1990 | Uri | 137/496 |

FOREIGN PATENT DOCUMENTS 946759 6/1949 France .................. 137/508

Primary Examiner—Stephen M. Hepperle
Attorney, Agent, or Firm—Griffin, Branigan & Butler

[57] ABSTRACT

A check valve comprises a valve body having inlet and outlet passages and a cavity in which a diaphragm operates. The inlet passage connects with the cavity through an upstream wall partly defining the cavity and the outlet passage connects with the cavity through a downstream wall partly defining the cavity. The diaphragm has an annular sheet metal part which is secured to one of the walls and carries a movable seal. The movable seal cooperates with a sealing element to provide a circular fluid seal. In a first embodiment, the inlet passage connects with the cavity through openings located inside the periphery of the circular fluid seal. In a second embodiment the inlet passage connects with the cavity through openings located outside the periphery of the circular fluid seal. The movable seal may be a sealing surface in which case the sealing element is a seal ring, or the movable seal may comprise a seal ring in which case the sealing element is a sealing surface.

5 Claims, 3 Drawing Sheets

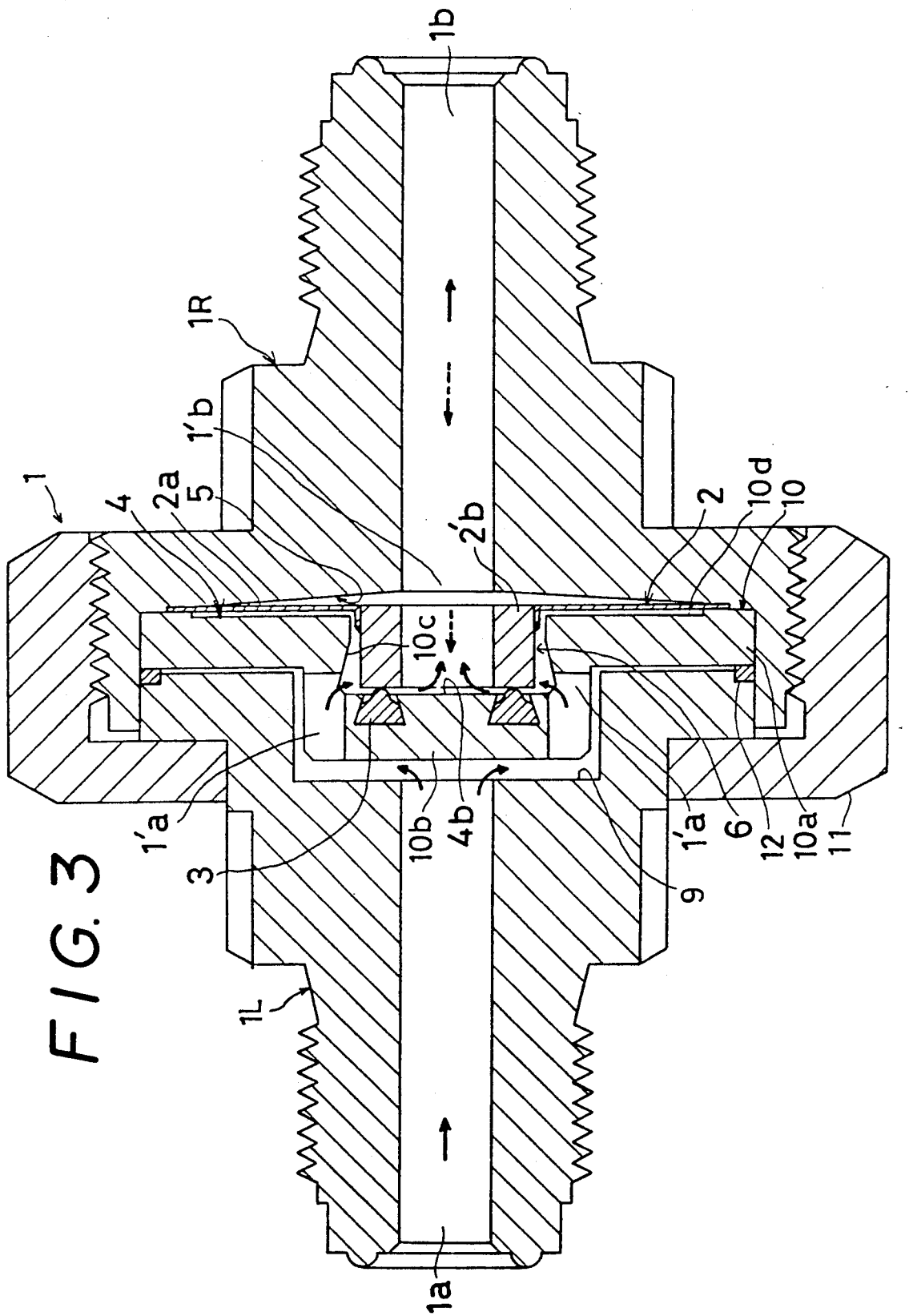

CHECK VALVE

FIELD OF THE INVENTION

The present invention relates to a line check valve of the type used to permit fluid flow in a forward direction but block fluid flow in a reverse direction. More particularly, the invention relates to a check valve having a diaphragm as the valve operating element, the construction of the valve being such that differential pressures act over most of the surface area of the diaphragm to cause operation of the valve.

BACKGROUND OF THE INVENTION

Line check valves are well known in the art. Typically, such valves comprise a valve body having inlet and outlet passages communicating with a cavity in which the operating elements of the valve are located. In one arrangement, the inlet passage terminates at a valve seat in the cavity. A valve disk is provided at the valve seat, the disk being biased toward the valve set by coil springs so that it may slide on it, rest on it, or be moved away from it.

The prior art valves have a relatively small area for receiving the "cracking" pressure, i.e. the pressure necessary to initially move the disk away from the valve seat. Thus, in cases where the inlet pressure or inlet flow volume is low, the valve may not always operate. Furthermore, precise adjustment of the spring is difficult to obtain and valves are frequently assembled with improper spring adjustment.

Furthermore, sliding of the spring biased disk relative to the valve seat causes these parts to wear and produces abrasion powder which enters the fluid flowing through the valve. Gas residues are also produced in the prior art valves because the valve cavity must be large to accommodate the relatively large number of parts and the internal valve structure is complicated. These characteristics make the prior art valves unsuitable for use in certain manufacturing equipment such as that used for making pharmaceutical or semiconductors, or in vacuum apparatus requiring a high degree of purity.

SUMMARY OF THE INVENTION

An object of the present invention is to provide a check valve requiring no springs and having relatively few parts.

An object of the invention is to provide a check valve which does not contribute to contamination of a fluid passing through the valve.

A further object of the invention is to provide a check valve comprising a valve body defining an inlet passage, an outlet passage and a cavity, and a diaphragm located within the cavity, the diaphragm carrying a movable seal which cooperates with a circular sealing element on a wall of the cavity to form a ring seal dividing the cavity into two regions, the inlet passage communicating with the cavity at a first of the regions and the outlet passage communicating with the cavity at the second of the regions. The diaphragm is a flat disk-like element which may be secured to either an upstream or downstream side wall of the cavity and may be secured at either its center region or at its circumference. If the central region of the diaphragm is secured to a wall surface, the movable seal is provided at the circumferential part of the diaphragm and the inlet passage communicates with the region on the inner side of the circular seal element. If the circumferential part of the diaphragm is secured to a wall surface, the diaphragm is ring-shaped and is provided with the movable seal at the center thereof, the inlet passage communicating with the region on the outer side of the circular seal element.

Other objects, features and advantages of the invention and its mode of operation will become apparent upon consideration of the following description and the accompanying drawings.

BRIEF DESCRIPTIONS OF THE DRAWINGS

DESCRIPTION OF PREFERRED EMBODIMENTS

Figure 1:
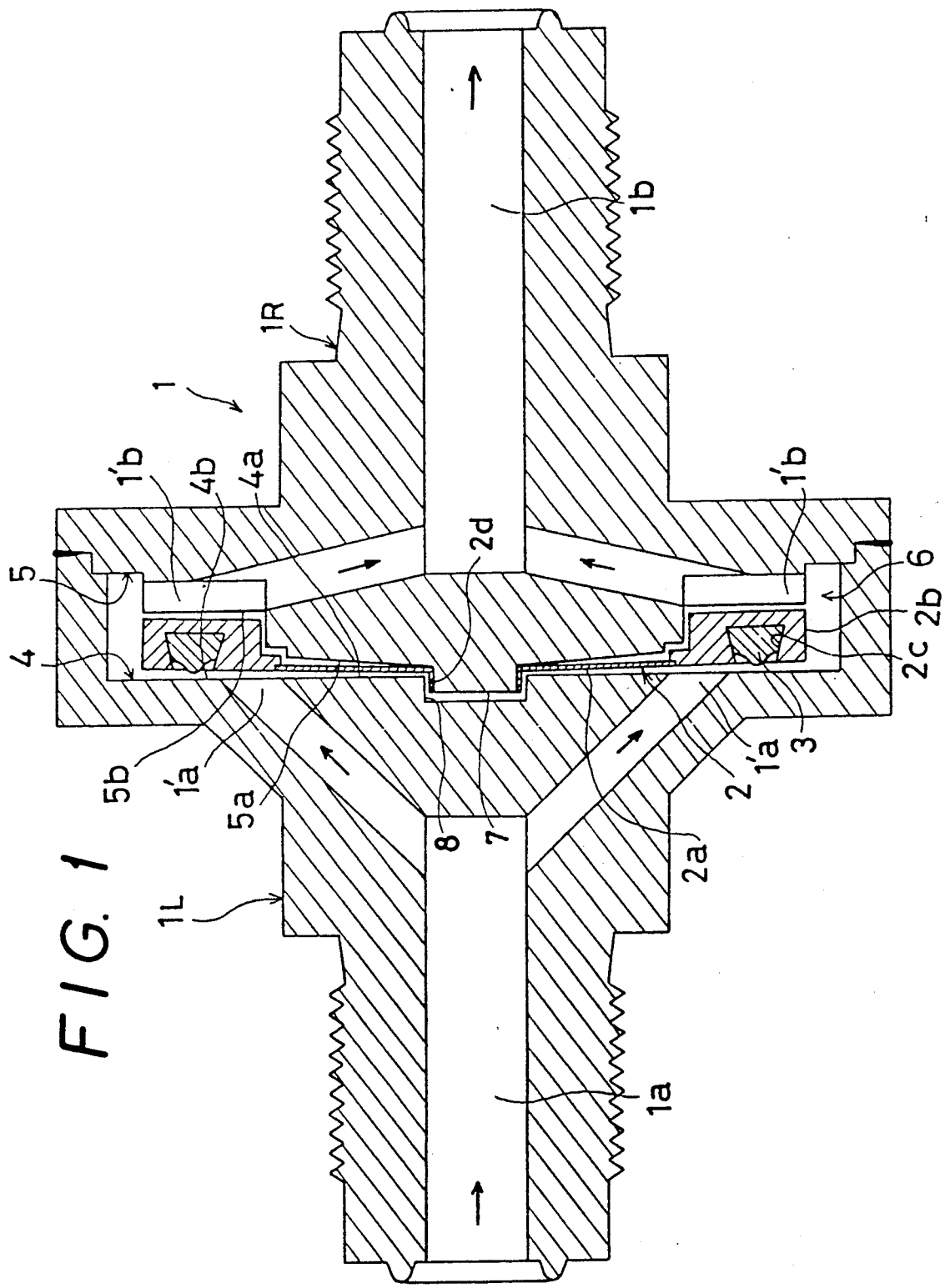
FIG. 1 is a sectional view of a check valve according to the invention, the valve parts being shown in a position assumed when a forward pressure is applied to the valve.
Figure 2:
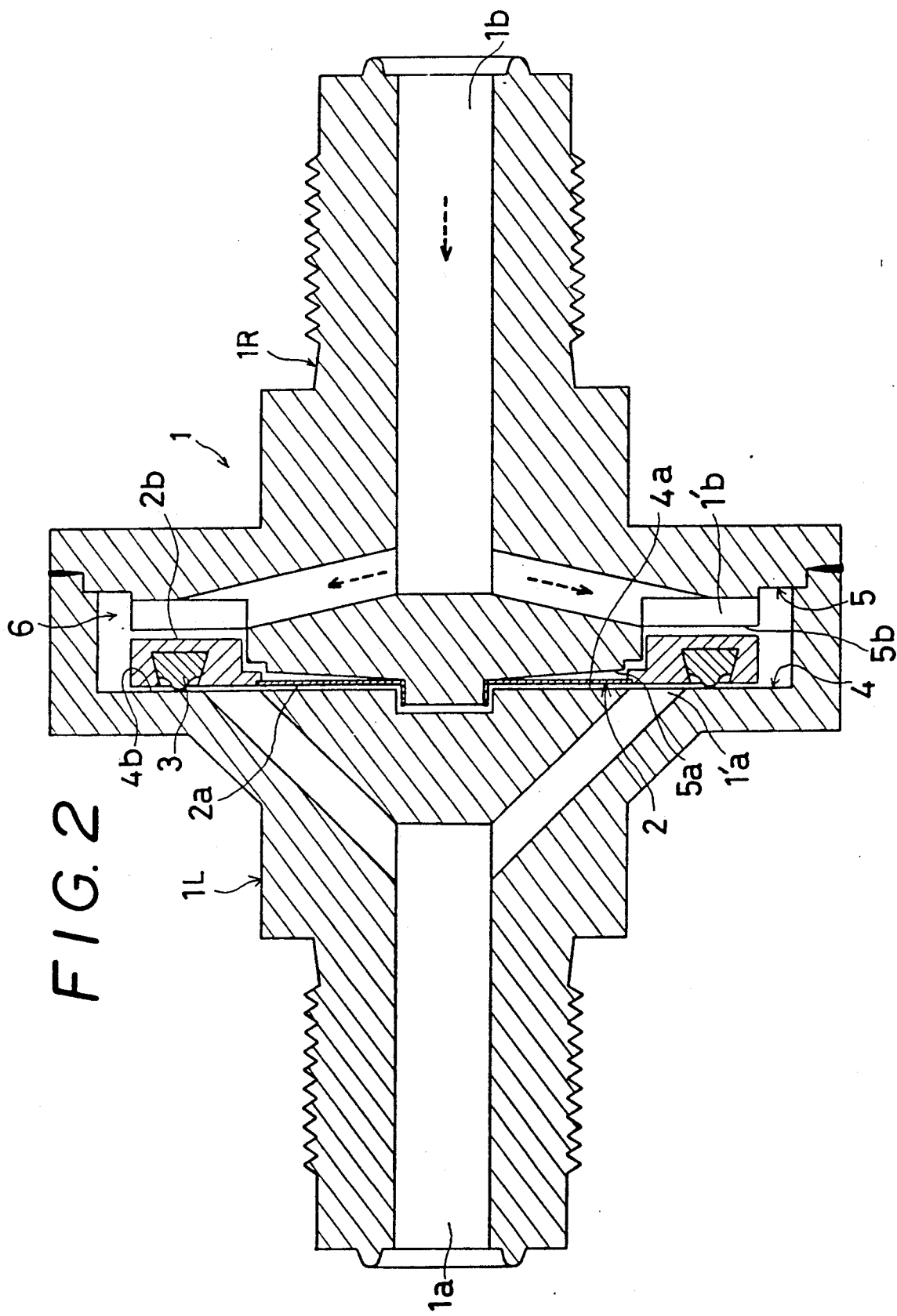
FIG. 2 is a sectional view similar to FIG. 1 but showing the valve parts in the position they assume when a back pressure is applied to the valve; and, FIG. 3 is a sectional view of a second embodiment of the invention.

As illustrated in FIGS. 1 and 2, a check valve constructed in accordance with the principles of the present invention comprises left and right valve body parts 1L and 1R, a diaphragm 2, and a seal ring 3. The valve has an inlet passage 1a formed in body part 1L, an outlet passage 1b formed in body part 1R, and a cavity 6 for receiving the diaphragm, the cavity being bound at one side by an upstream side wall surface 4 and at the other side by a downstream side wall surface 5. A plurality of passages $1^1a$ connect with inlet passage 1a and terminate at openings in side wall 4, the passage 1a and passages $1^1a$ together comprising an inlet passage means permitting flow of a fluid into the cavity 6. In like manner, a plurality of passages $1^1b$ connect with outlet passage 1b and terminate at openings in side wall 5, the passage 1b and passages $1^1b$ together comprising an outlet passage means. The body parts 1L, 1R may be secured together by screws or other conventional securing means (not shown).

The upstream side wall 4 is formed on the left valve body part 1L and includes a reverse pressure receiving surface 4a surrounded by a ring-shaped portion 4b which serves as a static seal surface. The wall portions 4a and 4b comprise a flat surface lying in a plane which is perpendicular to the inlet passage 1a. The passages $1^1a$ terminate at openings in the surface portion 4a radially inwardly of the ring-shaped portion 4b.

The downstream side wall 5 is formed on valve body part 1R and includes a slightly conical normal pressure receiving surface 5a and a ring-shaped flat normal pressure receiving surface 5b which lies in a plane perpendicular to the axes of the inlet and outlet passages 1a and 1b. In addition, the right valve body part 1R is shaped to have a leftwardly extending circular projection 7 located on the axis of the inlet and outlet passages 1a and 1b. A recess 8 is provided in the left valve body 1L to freely receive the projection 7.

The diaphragm 2 comprises a flat circular body 2a of thin sheet metal and a ring-shaped movable seal 2b secured to the periphery of the body 2a. The body 2a has a circular hub 2d which fits over the projection 7. Hub 2d permits the diaphragm to be welded to the projection 7 without creating a stress in the circular body 2a. The body 2a should be made as thin as possible to improve responsiveness as subsequently described.

The ring-shaped movable seal 2b is provided with a dovetail-shaped ring groove 2c facing toward the wall portion 4b. An elastic seal ring 3 of rubber, plastic or similar material may be molded and then forced into the groove. Alternatively, it may be cast into the groove 2c. In either event, the seal ring 3 is retained in the groove 2c because of the dovetail shape of the groove. If the valve is to be used in conditions where volatile solvents may be tolerated, the seal ring may be affixed to the movable seal 2b by means of an adhesive.

The arrangement of the valve structure is such that in a no-load state, that is, no pressure differential between the upstream and downstream sides of the diaphragm 2, the circular body 2a of the diaphragm 2 is not deformed and is in its normal flat state. The seal ring 3 is in contact with, but does not press against the static seal surface 4b so no seal is established between ring 3 and surface 4b. There is thus little likelihood that the ring will adhere to the surface 4b even if the ring is made of rubber.

When a fluid flows into the valve through inlet passage 1a, the resulting difference between the pressure acting on the surface of diaphragm 2 facing inlet passages $1^1a$, and the pressure acting on the surface facing outlet passages $1^1b$ deforms the diaphragm in the direction of the surface 5a. A fluid flow path is thus established from inlet passage 1a through passages $1^1a$, around the diaphragm 2 in cavity 6, and through passages $1^1b$ to outlet passage 1b as indicated by the directional arrows in FIG. 1.

Even if the inflow volume or inflow pressure in inlet passage 1a is small so that the difference in the pressures acting on the two sides of diaphragm 2 is small, the seal ring 3 will be reliably separated from surface 4b because the pressures act on almost the entire relatively large surface area of the diaphragm. At flow rates below a given level the diaphragm 2 is deformed so that the space opened between ring 3 and sealing surface 4b corresponds to the flow rate. However, if the flow rate exceeds the given level, or if an impact pressure is generated, the circular body 2a and the movable seal 2b move into engagement with the surfaces 5a and 5b, respectively, thereby preventing excessive loading or deformation of the diaphragm.

When fluid attempts to flow in the reverse direction, as indicated by the directional arrows in FIG. 2, the diaphragm assumes the position shown in that figure. As fluid starts to flow, the pressure difference between the pressure acting on the surface of diaphragm 2 facing passageways $1^1b$ and the pressure acting on the surface of diaphragm 2 facing passageways $1^1a$ deform the circular body 2a toward the surface 4a thereby causing the seal ring 3 to be pressed into sealing contact with the sealing surface 4b. As a result, the space between the circumference of the diaphragm 2 and surface 4b is closed and sealed thus blocking fluid flow from outlet passage 1b toward inlet passage 1a.

FIG. 3 illustrates several modifications which may be made in the embodiment of the invention described above. In FIG. 3, a seal ring support 10 is mounted between body parts 1L and 1R. A threaded coupling ring holds the body parts 1L and 1R together and clamps the periphery of the seal ring support 10 in position between body parts 1L, 1R. A ring seal 12 is provided between the body parts and the support to prevent leakage of fluid from the valve.

The support 10 comprises a flat plate-like portion 10a and a hub portion 10b. The flat portion 10a has a central opening 10c in which a tube-like movable seal $2^1b$ of diaphragm 2 may move. The movable seal $2^1b$ is welded or otherwise secured in the central opening of an annular thin sheet metal portion 2a of the diaphragm. The sheet metal portion is clamped around its periphery between the support 10 and the right body part 1R.

The hub portion 10b of support 10 is generally circular and is provided with a circular groove for receiving and retaining a seal ring 3. As viewed in FIG. 3, the left end surface of movable seal $2^1b$ cooperates with seal ring 3 to prevent flow of fluid in the reverse direction through the valve. The inlet passage 1a extends straight through body part 1L from the valve inlet to a recess 9. A plurality of passages $1^1a$ are provided in the support 10 to permit flow of fluid from inlet passage 1a and recess 9 into the cavity 6. The outlet passage 1b extends straight through body part 1b from the downstream side wall 5 to the valve outlet.

In the no-load state, annular metal portion 2a of the diaphragm holds the movable seal $2^1b$ so that its left end surface touches, but does not seal against, the seal ring 3.

When fluid flows into the valve in the forward direction, it passes through inlet passage 1a and into the recess region 9. From region 9 the fluid flows through passages $1^1a$ in support 10 and enters chamber 6. As viewed in FIG. 3, the right surface 10d of support 10 is recessed so that the fluid pressure may act over practically all of the left surface area of the annular sheet metal portion 2a of the diaphragm. The portion 2a is deflected to the right and carries with it the movable seal $2^1b$. The fluid flows between the seal ring 3 and the left end of the movable seal, through the opening in the movable seal, and then through outlet passage 1b.

When a back pressure or reverse flow occurs, the back pressure acts against the right side of the sheet metal portion 2a of the diaphragm. The left end wall 5 of the right body portion 1R is slightly curved or cone-shaped to permit the back pressure to act over most of the area of the diaphragm portion 2a. The pressure deflects diaphragm portion 2a to the left thus causing the movable seal $2^1b$ to move leftward whereby the left end of the movable seal seals against the seal ring 3. This prevents flow of fluid from the cavity 6 toward the inlet passage 1a.

From the foregoing description it is seen that the present invention provides a check valve which has few parts, is responsive to very small pressure differentials, has a small operating cavity, and does not contribute to contamination of a fluid flowing through the valve. While specific preferred embodiments have been described by way of illustration, it will be understood that various modifications and substitutions may be made in the described embodiments without departing from the spirit and scope of the invention as defined in the appended claims. For example, in FIG. 1, the seal ring 3 may be located on the upstream wall and the flat sealing surface may be provided on the movable seal 2b. In like manner, the seal ring 3 illustrated in FIG. 3 may be located on the movable element 2b. Other modifications will be obvious to those skilled in the art.

The invention in which an exclusive property or privilege are claimed is defined as follows.

What is claimed is:

1. A check valve comprising:

a valve body having an inlet passage means, an outlet passage means and a cavity defined by an upstream side wall and a downstream side wall;

a sealing means on one of said side walls, said sealing means and said movable seal cooperating to form a circular seal for selectively dividing said cavity into first and second regions;

said inlet passage means having at least one opening into said first region; and, said outlet passage means having at least one opening into said second region;

said diaphragm comprising a thin disk secured about its periphery to said downstream side wall, said thin disk having a central opening in which said movable seal is mounted, and said movable seal is tubular in shape with a central bore, said check valve further including a seal support comprising a plate with a central opening through which said movable seal may move, said upstream side wall comprising a hub attached to said plate and having said sealing means thereon.

2. A check valve as claimed in claim 1 wherein said movable seal has a flat end surface and said sealing ring is a circular seal which cooperates with the flat end surface of the movable seal to selectively divide said cavity into said first and second regions.

3. A check valve as claimed in claim 2 wherein said inlet passage means includes a plurality of fluid passages extending through said seal support in regions where said hub is attached to said plate and a valve inlet passage communicating with said fluid passages, said outlet passage means comprising a valve outlet passage communicating with the central bore of said movable seal.

4. A check valve as claimed in claim 3 wherein said thin disk is secured to said downstream side wall by clamping it between said plate and said downstream side wall, said plate having a surface which is recessed to provide a space between said plate and said disk so that a fluid pressure in said inlet passage may be communicated to a major portion of a side of said disk.

5. A check valve as claimed in claim 4 wherein said disk is flat and said downstream side wall diverges from said disk so that a fluid pressure in said outlet passage may act over a major portion of another side of said disk.

* * * * *